United States Patent
Chae et al.

(10) Patent No.: US 8,260,234 B2
(45) Date of Patent: Sep. 4, 2012

(54) APPARATUS AND METHOD FOR CALIBRATION IN MULTI-ANTENNA SYSTEM

(75) Inventors: Heon-Ki Chae, Seongnam-si (KR); Keun-Chul Hwang, Seongnam-si (KR); Soon-Young Yoon, Seoul (KR); Seok-Wan Rha, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 680 days.

(21) Appl. No.: 12/358,881

(22) Filed: Jan. 23, 2009

(65) Prior Publication Data

US 2009/0191819 A1 Jul. 30, 2009

(30) Foreign Application Priority Data

Jan. 25, 2008 (KR) .................. 10-2008-0007799

(51) Int. Cl.
*H04B 17/00* (2006.01)

(52) U.S. Cl. ............... 455/226.1; 455/67.11; 455/67.14; 455/67.16; 455/115.1; 455/303

(58) Field of Classification Search ............... 455/226.1, 455/67.14, 67.16, 227, 303, 67.11, 130, 132, 455/139, 226.3, 230–231, 304, 310, 125, 455/126, 115.1, 101, 103, 225, 232.1, 241.1, 455/245.2, 247.1, 251.1; 342/372, 373, 375, 342/383, 368

See application file for complete search history.

(56) References Cited

U.S. PATENT DOCUMENTS

| | | | | |
|---|---|---|---|---|
| 6,480,522 B1* | 11/2002 | Hoole et al. | | 375/130 |
| 6,690,952 B2* | 2/2004 | Nishimori et al. | | 455/562.1 |
| 6,704,349 B1* | 3/2004 | Masenten | | 375/219 |
| 7,230,570 B2* | 6/2007 | Thomas et al. | | 342/372 |
| 7,714,776 B2* | 5/2010 | Cooper et al. | | 342/174 |
| 7,969,358 B2* | 6/2011 | Martin et al. | | 342/368 |
| 2004/0219892 A1* | 11/2004 | Vaidyanathan et al. | | 455/103 |
| 2010/0056083 A1* | 3/2010 | Kim et al. | | 455/115.1 |
| 2011/0053646 A1* | 3/2011 | Kundmann et al. | | 455/562.1 |

* cited by examiner

*Primary Examiner* — Pablo Tran

(74) *Attorney, Agent, or Firm* — Jefferson IP Law, LLP

(57) ABSTRACT

Apparatus and method for calibration in a multi-antenna system are provided. The method includes setting at least two transmission paths connected to antennas, respectively, as reference transmission paths, when receiving compensation signals transmitted in the reference transmission paths in at least two reception paths connected to the antennas, respectively, determining a phase difference of the reception paths using the received compensation signals, and calibrating the reception paths using the phase difference of the reception paths.

10 Claims, 5 Drawing Sheets

APPARATUS AND METHOD FOR CALIBRATION IN MULTI-ANTENNA SYSTEM

PRIORITY

This application claims the benefit under 35 U.S.C. §119(a) to a Korean patent application filed on Jan. 25, 2008 in the Korean Intellectual Property Office and assigned Serial No. 10-2008-0007799, the entire disclosure of which is hereby incorporated by reference.

BACKGROUND OF THE INVENTION

1. Field of the Invention

The present invention relates generally to an apparatus and a method for calibration in a multi-antenna system. More particularly, the present invention relates to an apparatus and a method for carrying out calibration without separate transmission and reception paths for the calibration in the multi-antenna system.

2. Description of the Related Art

A multi-antenna system may minimize interference by forming a beam toward a receiving end to transmit a signal using smart antennas or a beamforming device. For the beamforming, the multi-antenna system applies a beam coefficient per antenna. Using an Orthogonal Frequency Division Multiple Access (OFDMA) scheme, the multi-antenna system applies the beam coefficient per tone with respect to the respective antennas.

To apply the beam coefficient per antenna, a transmitting end of the multi-antenna system needs to control phase and magnitude of signals input to the antennas. The transmitting end conducts calibration to avoid distortion of the phase and the magnitude of the signals according to nonlinear characteristics of elements constituting a transmission path and a reception path.

FIG. 1 depicts a conventional calibration apparatus in a multi-antenna system.

In the multi-antenna system of FIG. 1, a transmitting end includes $N_T$-ary antennas, couplers 100-1 through 100-$N_T$, Time Division Duplex (TDD) switches 110-1 through 110-$N_T$, transmitters 120-1 through 120-$N_T$, receivers 130-1 through 130-$N_T$, Digital Up Converters (DUCs) 140-1 through 140-$N_T$, Digital Down Converters (DDCs) 150-1 through 150-$N_T$, a controller 160, a compensation signal processor 170 and a compensation transceiver 180. Herein, transmission paths and reception paths of the antennas operate substantially the same. Thus, the transmission path and the reception path for the first antenna are illustrated by way of example.

In the calibration of the transmission path, the controller 160 forwards a compensation signal output from the compensation signal processor 170 to the DUC 140-1.

The DUC 140-1 oversamples the compensation signal fed from the controller 160.

The transmitter 120-1 converts the signal output from the DUC 140-1 to a Radio Frequency (RF) signal.

The TDD switch 110-1 transmits the RF signal output from the transmitter 120-1 to the coupler 100-1. That is, the TDD switch 110-1 switches to connect the transmitter 120-1 and the coupler 100-1 in the transmission interval.

The coupler 100-1 transmits the RF signal provided from the TDD switch 110-1 via the antenna. The coupler 100-1 couples the RF signal to the compensation transceiver 180.

The compensation transceiver 180 converts the RF signal fed from the coupler 100-1 to a baseband signal and outputs the baseband signal to the compensation signal processor 170. The compensation transceiver 180 includes a divider 181, a TDD switch 183, a transmitter 185, a receiver 187, a DUC 188 and a DDC 189. Herein, the components of the compensation transceiver 180 operate the same as the components of the transmission path and the reception path of the antennas and shall not be described.

The compensation signal processor 170 examines the distortion of the transmission paths connected to the respective antennas using the signals provided from the compensation transceiver 180 and calibrates the transmission path.

The transmitting end generates the beam coefficient for the beamforming by taking into account the distortion of the transmission paths confirmed at the compensation signal processor 170.

In the calibration of the reception path, the compensation signal processor 170 transmits the compensation signal to the compensation transceiver 180 under the control of the controller 160.

The compensation transceiver 180 converts the baseband compensation signal fed from the compensation signal processor 170 to an RF signal and outputs the RF signal to the coupler 100-1 of the antenna via the divider 171.

The coupler 100-1 combines the RF signal fed from the compensation transceiver 180 with the signal received via the antenna and transfers the combined signal to the receiver 130-1 via the TDD switch 110-1.

In the reception interval, the TDD switch 110-1 switches to connect the receiver 130-1 and the coupler 100-1.

The receiver 130-1 converts the RF signal output from the TDD switch 110-1 to a baseband signal and transmits the baseband signal to the controller 160 through the DDC 150-1.

The controller 160 detects the compensation signal from the signal output from the DDC 150-1 and outputs the detected compensation signal to the compensation signal processor 170.

The compensation signal processor 170 examines the distortion of the reception paths connected to the respective antennas using the compensation signals provided from the controller 160 and calibrates the reception paths.

As discussed above, to compensate for the magnitude and the phase of the signals of the transmission path and the reception path by means of the calibration, the multi-antenna system requires separate transmission and reception paths. Accordingly, the transmitting end and the receiving end of the multi-antenna system are subject to the increased complexity and the raised cost due to the separate compensation transceiver for the calibration.

Therefore, a need exists for a system and method for calibrating transmission paths and reception paths in a multi-antenna system by reducing costs and increasing the calibration accuracy.

SUMMARY OF THE INVENTION

An aspect of the present invention is to address at least the above-mentioned problems and/or disadvantages and to provide at least the advantages described below. Accordingly, an aspect of the present invention is to provide an apparatus and method for calibrating transmission paths and reception paths without using a separate compensation device for the calibration in a multi-antenna system.

Another aspect of the present invention is to provide an apparatus and a method for calibrating a transmission path using a reception path not operating in a transmission interval in a multi-antenna system using a Time Division Duplex (TDD) scheme.

Still another aspect of the present invention is to provide an apparatus and a method for calibrating a reception path using a transmission path not operating in a reception interval in a multi-antenna system using a TDD scheme.

In accordance with an aspect of the present invention, a calibration method of a reception path in a wireless communication system comprising at least two antennas is provided. The method includes setting at least two transmission paths connected to antennas, respectively, as reference transmission paths, when receiving compensation signals transmitted in the reference transmission paths in at least two reception paths connected to the antennas, respectively, calculating a phase difference of the reception paths using the received compensation signals, and calibrating the reception paths using the phase difference of the reception paths.

In accordance with another aspect of the present invention, a calibration method of a transmission path in a wireless communication system comprising at least two antennas is provided. The method includes setting at least two reception paths connected to antennas, respectively, as reference reception paths, when compensation signals transmitted in at least two transmission paths connected to the antennas are received in the reference reception paths, calculating a phase difference of the transmission paths using the received compensation signals, and calibrating the transmission paths using the phase difference of the transmission paths.

In accordance with still another aspect of the present invention, a calibration apparatus of a reception path in a multi-antenna system is provided. The apparatus includes at least two antennas, at least two transmission paths connected to antennas, respectively, for transmitting a signal, at least two reception paths connected to the antennas, respectively, for receiving a signal, a controller for setting at least two of the transmission paths as reference transmission paths, transmitting a compensation signal in each reference transmission path, and transmitting the compensation signals to a compensation signal processor when the transmitted compensation signals are received in the reception paths, and the compensation signal processor for calculating a phase difference of the reception paths using the compensation signals provided from the controller and calibrating the reception paths using the determined phase difference of the reception paths.

In accordance with yet another aspect of the present invention, a calibration apparatus of a transmission path in a multi-antenna system is provided. The apparatus includes at least two antennas, at least two transmission paths connected to antennas, respectively, for transmitting a signal, at least two reception paths connected to the antennas, respectively, for receiving a signal, a controller for setting at least two of the reception paths as reference reception paths, transmitting a compensation signal in the transmission paths, and transiting the received compensation signals to a compensation signal processor when the transmitted compensation signals are received in the reference reception paths, and the compensation signal processor for calculating a phase difference of the transmission paths using the compensation signals provided from the controller and calibrating the transmission paths using the determined phase difference of the transmission paths.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a technique for performing calibration without adopting a separate compensation transceiver for the calibration in a multi-antenna system.

According to a Time Division Duplex (TDD) scheme, the multi-antenna system transmits and receives a downlink signal and an uplink signal using different time resources. Correspondingly, a transmitting end does not use a reception path in the downlink interval and does not use a transmission path in the uplink interval. Herein, the downlink interval is a time region for carrying a signal from the transmitting end to a receiving end, and the uplink interval is a time region for receiving a signal from the receiving end.

Figure 1:
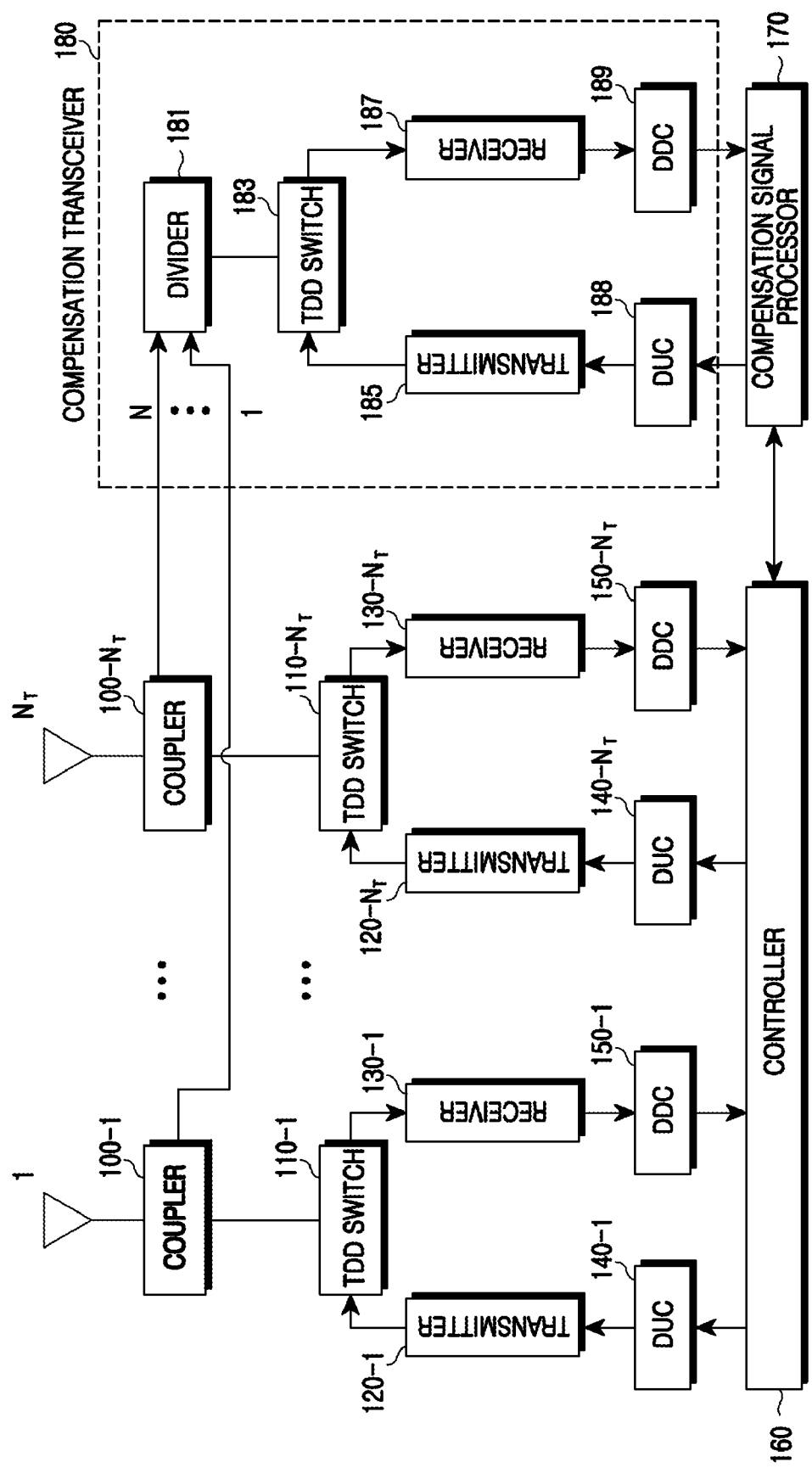
FIG. 1 illustrates a conventional calibration apparatus in a multi-antenna system.
Figure 2:
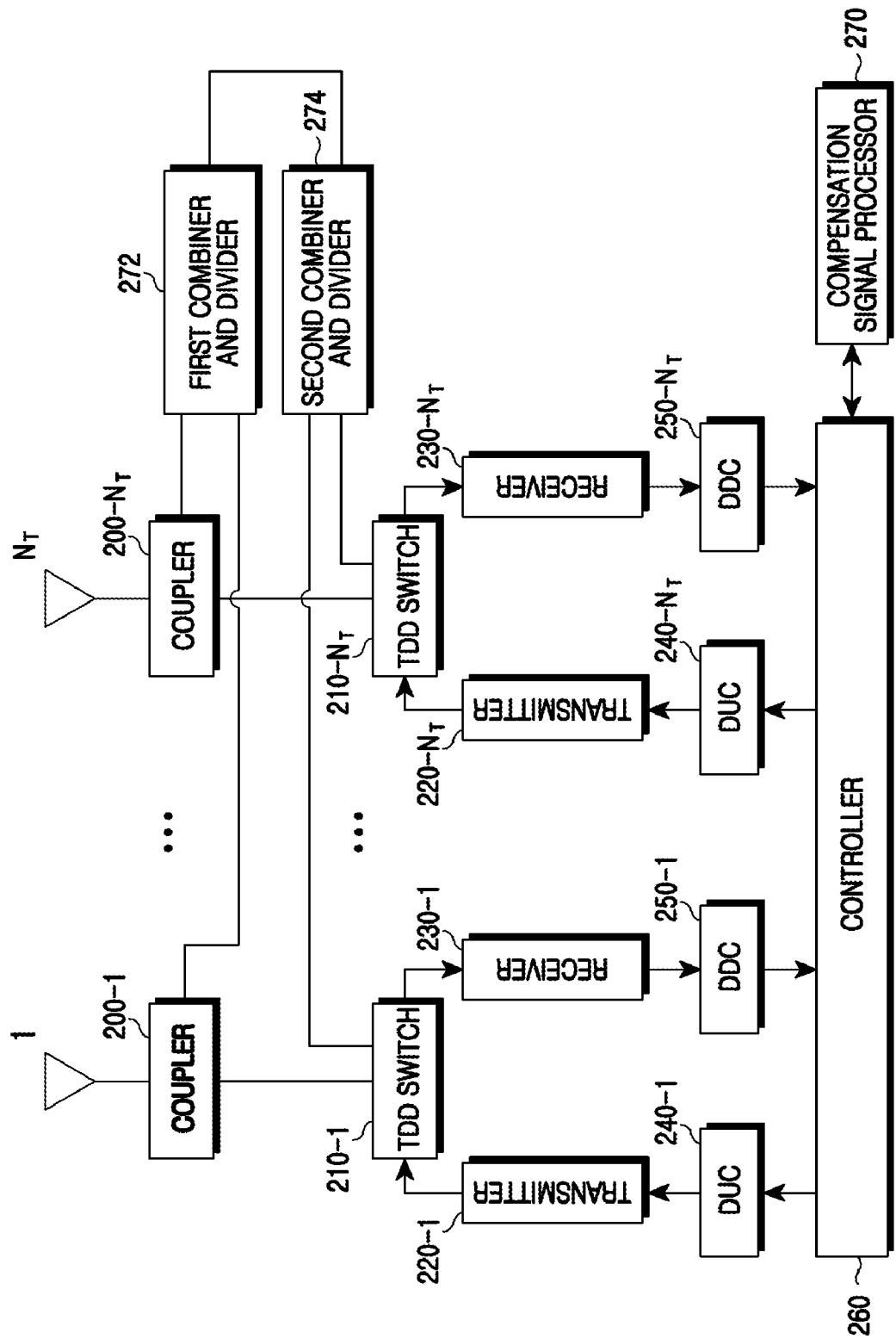
FIG. 2 illustrates a calibration apparatus in a multi-antenna system according to an exemplary embodiment of the present invention.

Hereinafter, for the calibration without using a separate compensation transceiver, the transmitting end of the multi-antenna system calibrates the transmission path using the reception path not used in the downlink interval. The transmitting end calibrates the reception path using the transmission path not used in the uplink interval. For example, the transmitting end is constructed as illustrated in FIG. 2 for calibration without the separate compensation transceiver. Subsequently, a transmission path connected to an N-th antenna is referred to as an N-th transmission path and a reception path connected to the N-th antenna is referred to as an N-th reception path.

FIG. 2 is a block diagram of a calibration apparatus in a multi-antenna system according to an exemplary embodiment of the present invention.

The transmitting end of the multi-antenna system of FIG. 2 includes $N_T$-ary antennas, couplers 200-1 through 200-$N_T$, TDD switches 210-1 through 210-$N_T$, transmitters 220-1 through 220-$N_T$, receivers 230-1 through 230-$N_T$, Digital Up Converters (DUCs) 240-1 through 240-$N_T$, Digital Down Converters (DDCs) 250-1 through 250-$N_T$, a controller 260, a compensation signal processor 270, and combiners and dividers 272 and 274.

To calibrate the transmission path, the controller 260 transfers a compensation signal provided from the compensation signal processor 270 to the DUCs 240 of the transmission paths in sequence. Herein, the transmission paths connected to the respective antennas operate substantially the same. Hence, the first transmission path connected to the first antenna is illustrated by way of example. The controller 260 transmits the compensation signal provided from the compensation signal processor 270 to the DUC 240-1 which includes the transmission path of the first antenna.

The DUC 240-1 oversamples the compensation signal fed from the controller 260 and transmits the oversampled compensation signal to the transmitter 220-1.

The transmitter 220-1 converts the signal output from the DUC 240-1 to a Radio Frequency (RF) signal and outputs the RF signal to the coupler 200-1 via the TDD switch 210-1.

The TDD switch 210-1 switches to transmit the compensation signal from the transmitter 220-1 to the coupler 200-1.

The coupler 200-1 transmits the RF signal fed from the TDD switch 210-1 over the antenna. The coupler 200-1 couples the RF signal to the first combiner and divider 272.

The first combiner and divider 272 forwards the signals provided from the couplers 200-1 through 200-$N_T$ of the antennas to the second combiner and divider 274.

The second combiner and divider 274 forwards the signal output from the first combiner and divider 272 to the TDD switch 210 of the reception path set as a reference reception path. For example, when the reception path of the $N_T$-th antenna is set to the reference reception path, the second combiner and divider 274 forwards the signal fed from the first combiner and divider 272 to the TDD switch 210-$N_T$ which includes the reception path of the $N_T$-th antenna.

The TDD switch 240-$N_T$ switches to transmit the compensation signal provided from the second combiner and divider 274 to the receiver 230-$N_T$.

The receiver 230-$N_T$ converts the RF compensation signal output from the TDD switch 210-$N_T$ to a baseband signal and transfers the baseband signal to the controller 260 via the DDC 250-$N_T$.

The controller 260 forwards the compensation signal output from the DDC 250-$N_T$ to the compensation signal processor 270.

The compensation signal processor 270 examines distortion of the transmission paths connected to the respective antennas using the compensation signals fed from the controller 260 and calibrates the transmission paths.

To calibrate the transmission paths, the compensation signal processor 270 uses a conjugate component of a relative phase difference of the transmission paths.

When the transmitting end including four antennas sets the fourth reception path as the reference reception path, the controller 260 controls the compensation signal processor 270 to determine the phase difference of the first transmission path, the second transmission path and the third transmission path using the compensation signal received in the fourth reception path. Accordingly, the controller 260 controls not to calibrate the fourth transmission path connected to the antenna of the reference reception path by taking into account a leakage of the compensation signal within the TDD switch 210-4.

For example, the controller 260 transfers the compensation signal in the first transmission path, the second transmission path and the third transmission path in sequence. Next, the controller 260 receives the compensation signals transmitted in the transmission paths, through the fourth reception path and provides the received signals to the compensation signal processor 270. The compensation signals received at the controller 260 may be expressed as Equation (1).

$$C_{41}(t)=R_4 C(t) e^{jTx1} e^{j\theta_{Rx4}}$$

$$C_{42}(t)=R_4 C(t) e^{jTx2} e^{j\theta_{Rx4}}$$

$$C_{43}(t)=R_4 C(t) e^{jTx3} e^{j\theta_{Rx4}} \quad (1)$$

In Equation (1), $C_{nm}(t)$ denotes the compensation signal received in the n-th reception path in relation to the m-th transmission path, $R_n$ denotes path characteristics of the n-th reception path and the coupler 200-n, and $C(t)$ denotes the compensation signal transmitted in the transmission path. $Tx_m$ denotes characteristics of the m-th transmission path and $\theta_{Rxn}$ denotes phase characteristic of the n-th reception path.

When the transmitting end including four antennas sets the first reception path as the reference reception path, the controller 260 controls the compensation signal processor 270 to determine the phase difference of the second transmission path, the third transmission path and the fourth transmission path using the compensation signal received in the fourth reception path. Accordingly, the controller 260 controls not to calibrate the fourth transmission path connected to the antenna of the reference reception path by taking into account the leakage of the compensation signal within the TDD switch 210.

For example, the controller 260 transfers the compensation signal in the second transmission path, the third transmission path and the fourth transmission path in sequence. Next, the controller 260 receives the compensation signals transmitted in the transmission paths, through the first reception path, and provides the received signals to the compensation signal processor 270. The compensation signals received at the controller 260 may be expressed as Equation (2).

$$C_{12}(t)=R_1 C(t) e^{jTx2} e^{j\theta_{Rx1}}$$

$$C_{13}(t)=R_1 C(t) e^{jTx3} e^{j\theta_{Rx1}}$$

$$C_{14}(t)=R_1 C(t) e^{jTx4} e^{j\theta_{Rx1}} \quad (2)$$

In Equation (2), $C_{nm}(t)$ denotes the compensation signal received in the n-th reception path in relation to the m-th transmission path, $R_n$ denotes path characteristics of the n-th reception path and the coupler 200-n, and $C(t)$ denotes the compensation signal transmitted in the transmission path. $Tx_m$ denotes characteristics of the m-th transmission path and $\theta_{Rxn}$ denotes phase characteristic of the n-th reception path.

As stated above, since the transmission path of the antenna set as the reference reception path is excluded from the calibration, the compensation signal processor 270 cannot determine the phase difference of the transmission path of the antenna set as the reference reception path. Thus, to determine the phase difference of all of the transmission paths, the controller 260 sets two or more reception paths as the reference reception paths.

The compensation signal processor 270 determines the phase difference of all of the transmission paths using the phase difference of the transmission paths acquired by setting the first reception path as the reference reception path and the phase difference of the transmission paths acquired by setting the fourth reception path as the reference reception path, and calibrates the transmission paths. For example, the compensation signal processor 270 determines the phase difference of the transmission paths as illustrated in Table 1.

TABLE 1

| | | $1^{st}$ antenna | $2^{nd}$ antenna | $3^{rd}$ antenna | $4^{th}$ antenna |
|---|---|---|---|---|---|
| 1 | $W_{tx}^{temp1}$ | $\angle(Tx1 + \theta_{Rx4})$ | $\angle(Tx2 + \theta_{Rx4})$ | $\angle(Tx3 + \theta_{Rx4})$ | — |
|   | $==> W_{tx}^{temp1} - \angle(Tx1 + \theta_{Rx4})$ | $==> \angle 0$ | $==> \angle(Tx2 - Tx1)$ | $==> \angle(Tx3 - Tx1)$ | |
| 2 | $W_{tx}^{temp2}$ | — | $\angle(Tx2 + \theta_{Rx1})$ | $\angle(Tx3 + \theta_{Rx1})$ | $\angle(Tx4 + \theta_{Rx1})$ |
|   | $==> W_{tx}^{temp2} - \angle(Tx2 + \theta_{Rx1})$ | | $==> \angle 0$ | $==> \angle(Tx3 - Tx2)$ | $==> \angle(Tx4 - Tx2)$ |
| 3 | $==> W_{tx}^{temp2} + \angle(Tx2 - Tx1)$ | | $==> \angle(Tx2 - Tx1)$ | $==> \angle(Tx3 - Tx1)$ | $==> \angle(Tx4 - Tx1)$ |
| 4 | $W_{tx}^{final} = conj(W_{tx}^{temp2})$ | $\angle 0$ | $\angle -(Tx2 - Tx1)$ | $\angle -(Tx3 - Tx1)$ | $\angle -(Tx4 - Tx1)$ |

When the fourth reception path is set to the reference reception path, the compensation signal processor 270 determines the phase difference of the first transmission path, the second transmission path and the third transmission path as expressed in a first operation of Table 1.

When the first reception path is set to the reference reception path, the compensation signal processor 270 determines the phase difference of the second transmission path, the third transmission path and the fourth transmission path as expressed in a second operation of Table 1.

To determine the phase difference of all of the transmission paths, the compensation signal processor 270 determines a relative phase difference of the transmission paths as expressed in a third operation of Table 1.

As expressed in a fourth operation of Table 1, the compensation signal processor 270 calibrates the transmission paths using the conjugate component of the relative phase difference of the transmission paths.

In the calibration of the reception path, the controller 260 forwards the compensation signal from the compensation signal processor 270 to the DUCs 240 of the reference transmission paths. For example, when the first transmission path and the fourth transmission path are set to the reference transmission paths, the controller 260 transmits the compensation signal to the DUC 240-1 of the first transmission path. The controller 260 also transmits the compensation signal to the DUC 240-4 of the fourth transmission path. Herein, the first transmission path and the fourth transmission path operate substantially the same. Accordingly, the first transmission path is illustrated by way of example.

The DUC 240-1 oversamples the compensation signal provided from the controller 260 and transmits the oversampled signal to the transmitter 220-1.

The transmitter 220-1 converts the signal output from the DUC 240-1 to an RF signal and transfers the RF signal to the second combiner and divider 274 through the TDD switch 210-1.

The TDD switch 210-1 switches to transmit the compensation signal output from the transmitter 220-1 to the second combiner and divider 274.

The second combiner and divider 274 forwards the compensation signal fed from the TDD switch 210-1 of the reference transmission path to the first combiner and divider 272.

The first combiner and divider 272 transmits the compensation signal provided from the second combiner and divider 274 to the couplers 200 of antennas other than an antenna connected with the reference transmission path. For instance, when the first transmission path is set to the reference transmission path, the first combiner and divider 272 transmits the compensation signal provided from the second combiner and divider 274 to the couplers 200-2 through 200-NT of the second through NT-th antennas. Herein, the reception paths of the compensation signal operate substantially the same. Thus, the second reception path is described by way of example.

The coupler 200-2 combines the compensation signal fed from the first combiner and divider 272 with the signal received via the antenna and transmits the combined signal to the receiver 230-2 through the TDD switch 210-2.

The TDD switch 210-2 switches to transmit the compensation signal from the first combiner and divider 272 to the receiver 230-2.

The receiver 230-2 converts the RF signal output from the TDD switch 210-2 to a baseband signal and transmits the baseband signal to the controller 260 via the DDC 250-2.

The controller 260 detects the compensation signal from the signal output from the DDC 250-2 and provides the detected compensation signal to the compensation signal processor 270.

The compensation signal processor 270 examines the distortion of the reception paths connected to the respective antennas based on the compensation signals provided from the controller 260 and calibrates the reception paths.

While calibrating the reception paths, the compensation signal processor 270 utilizes the conjugate component of the relative phase difference of the reception paths.

When the transmitting end including four antennas sets the fourth transmission path as the reference transmission path, the controller 260 controls the compensation signal processor 270 to determine the phase difference of the first reception path, the second reception path and the third reception path using the compensation signals received in the first reception path, the second reception path and the third reception path. Accordingly, the controller 260 controls to not calibrate the fourth reception path connected to the antenna of the reference transmission path.

For example, the controller 260 transfers the compensation signal in the fourth transmission path. Next, the controller 260 receives the compensation signals through the first reception path, the second reception path and the third reception path and provides the received compensation signals to the compensation signal processor 270. The compensation signals received at the controller 260 may be expressed as Equation (3).

$$C_1(t) = R_1 C(t) e^{jTx4} e^{j\theta_{Rx1}}$$

$$C_2(t) = R_2 C(t) e^{jTx4} e^{j\theta_{Rx2}}$$

$$C_3(t) = R_3 C(t) e^{jTx4} e^{j\theta_{Rx3}} \quad (3)$$

In Equation (3), $C_n(t)$ denotes the compensation signal received in the n-th reception path, $R_n$ denotes path characteristics of the n-th reception path and the coupler 200-n, and C(t) denotes the compensation signal transmitted in the reference transmission path. $Tx_m$ denotes characteristics of the m-th transmission path and $\theta_{Rxn}$ denotes phase characteristic of the n-th reception path.

When the transmitting end including four antennas sets the first transmission path as the reference transmission path, the controller 260 controls the compensation signal processor 270 to determine the phase difference of the second reception path, the third reception path and the fourth reception path using the compensation signals received in the second reception path, the third reception path, and the fourth reception path. Accordingly, the controller 260 controls not to calibrate the first reception path connected to the antenna of the reference transmission path.

For example, the controller 260 transfers the compensation signal in the first transmission path. Next, the controller 260 receives the compensation signals through the second reception path, the third reception path, and the fourth reception path and provides the received compensation signals to the compensation signal processor 270. The compensation signals received at the controller 260 may be expressed as Equation (4).

$$C_2(t) = R_2 C(t) e^{j Tx1} e^{j\theta_{Rx2}}$$
$$C_3(t) = R_3 C(t) e^{j Tx1} e^{j\theta_{Rx3}}$$
$$C_4(t) = R_4 C(t) e^{j Tx1} e^{j\theta_{Rx4}} \quad (4)$$

In Equation (4), $C_n(t)$ denotes the compensation signal received in the n-th reception path, $R_n$ denotes path characteristics of the n-th reception path and the coupler 200-n, and C(t) denotes the compensation signal transmitted in the reference transmission path. $Tx_m$ denotes characteristics of the m-th transmission path and $\theta_{Rxn}$ denotes phase characteristic of the n-th reception path.

As described above, since the reception path of the antenna set as the reference transmission path is excluded from the calibration, the compensation signal processor 270 cannot determine the phase difference of the reception path of the antenna set as the reference transmission path. Thus, to determine the phase difference of all the reception paths, the controller 260 sets two or more transmission paths as the reference transmission paths.

The compensation signal processor 270 determines the phase difference of all the reception paths of the transmitting end using the phase difference of the reception paths acquired by setting the first transmission path as the reference transmission path and the phase difference of the reception paths acquired by setting the fourth transmission path as the reference transmission path. The compensation signal processor 270 then calibrates the reception paths. For example, the compensation signal processor 270 determines the phase difference of the reception paths as illustrated in Table 2.

When the first transmission path is set to the reference transmission path, the compensation signal processor 270 determines the phase difference of the second reception path, the third reception path and the fourth reception path as expressed in a first operation of Table 2.

When the fourth transmission path is set to the reference transmission path, the compensation signal processor 270 determines the phase difference of the first reception path, the second reception path and the third reception path as expressed in a second operation of Table 2.

Next, to determine the phase difference of all the reception paths, the compensation signal processor 270 determines the relative phase difference of the reception paths as expressed in a third operation of Table 2.

As expressed in a fourth operation of Table 2, the compensation signal processor 270 calibrates the reception paths using the conjugate component of the relative phase difference of the reception paths.

As a result, the transmitting end of the multi-antenna system performs the calibration without using separate compensation transmission and reception paths. The TDD switches 210-1 and 210-$N_T$ of FIG. 2 may be constructed as illustrated in FIG. 3.

Figure 3:
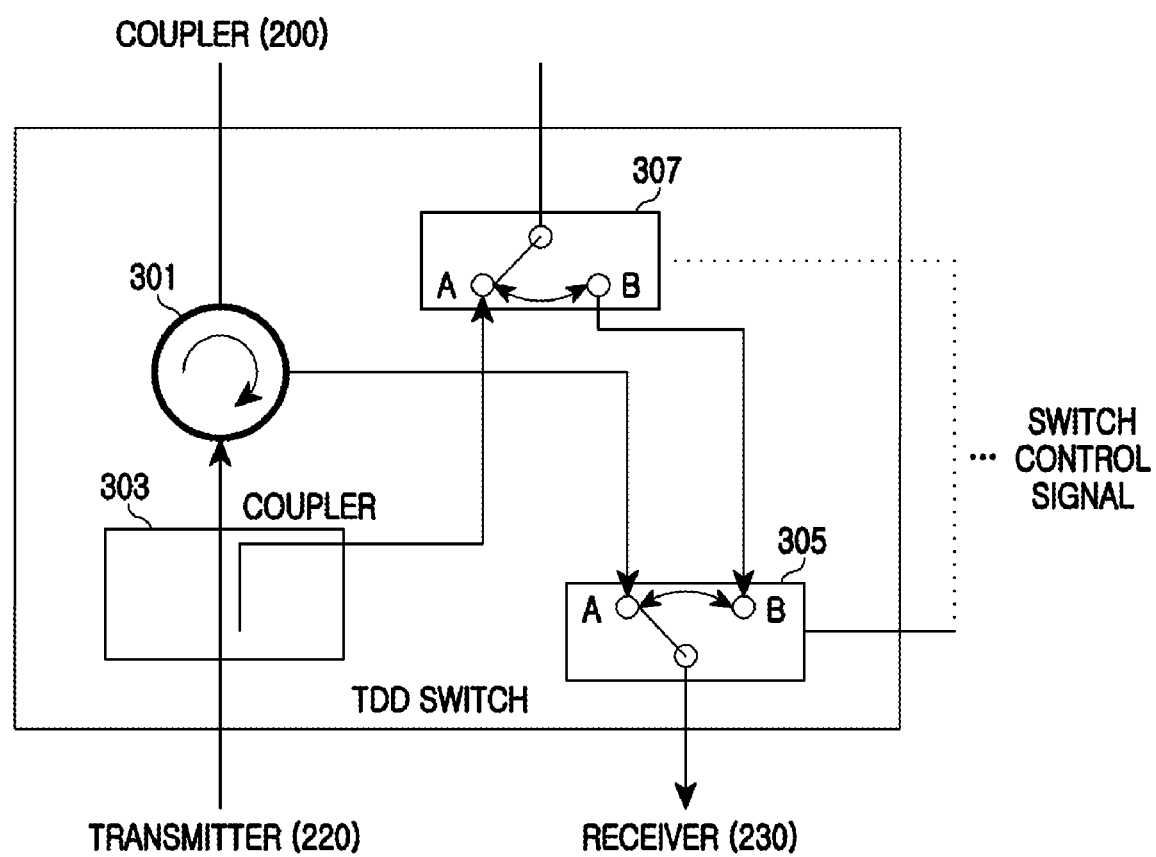
FIG. 3 illustrates a Time Division Duplex (TDD) switch of a calibration apparatus in a multi-antenna system according to an exemplary embodiment of the present invention.

FIG. 3 depicts the TDD switch of a calibration apparatus in a multi-antenna system according to an exemplary embodiment of the present invention.

Referring to FIG. 3, the TDD switch 210 includes a circulator 301, a coupler 303 and switches 305 and 307.

The circulator 301 blocks the transmit signal from flowing into the reception path in the downlink interval.

The coupler 303 couples the compensation signal transmitted in the reference transmission path and transmits the coupled compensation signal to the second combiner and divider 274 to calibrate the reception paths in the downlink interval.

The switches 305 and 307 are connected to a port A to transmit the signal received from the receiving end in the reception path during the uplink interval. When the transmission paths are calibrated in the uplink interval, the switches 305 and 307 are connected to a port B.

To transmit the signal in the downlink interval or to transmit the compensation signal, the switches 305 and 307 are connected to the port B.

Figure 4:
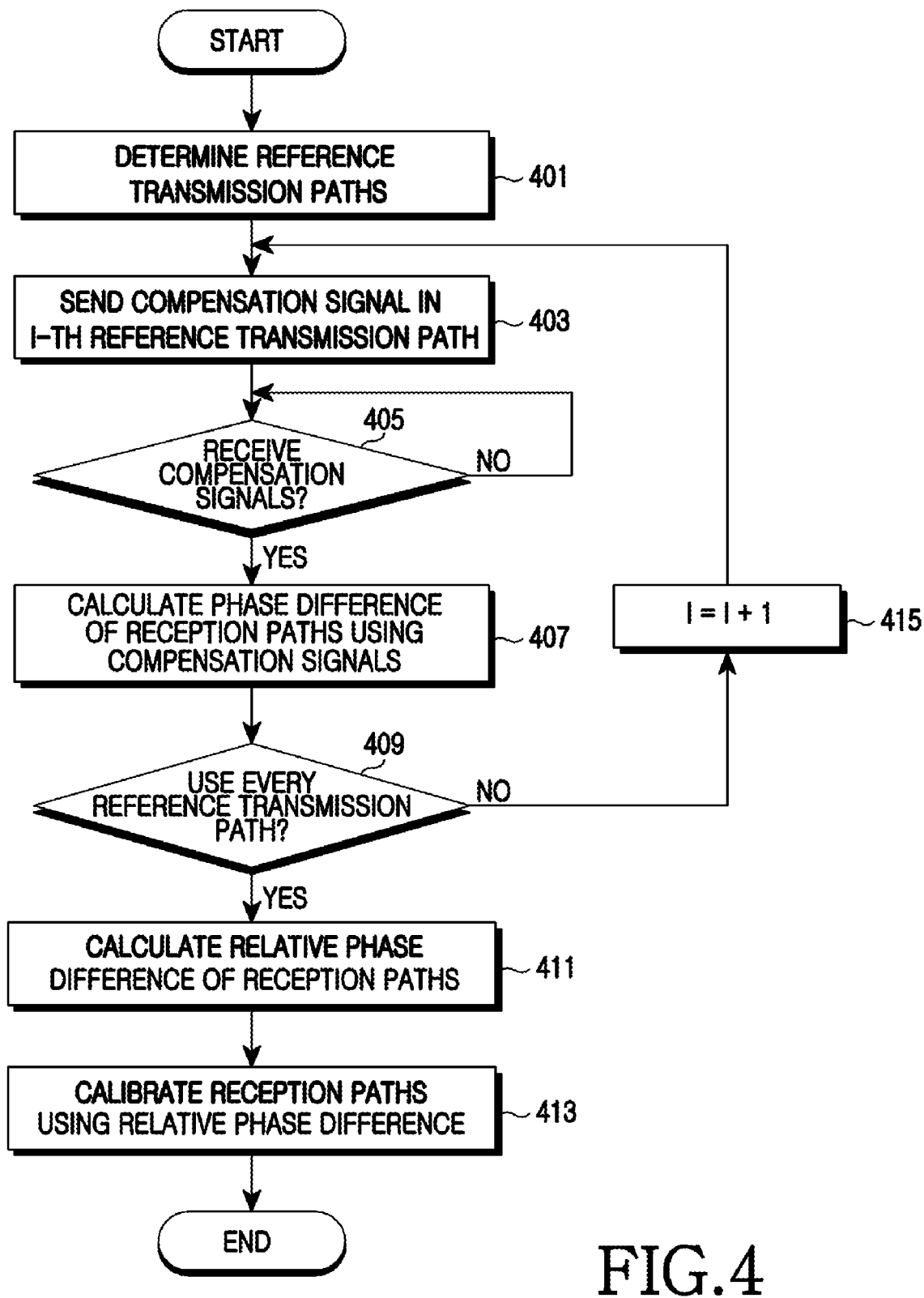
FIG. 4 illustrates a calibration method of a reception path in a multi-antenna system according to an exemplary embodiment of the present invention.

FIG. 4 illustrates a calibration method of a reception path in a multi-antenna system according to an exemplary embodiment of the present invention.

Referring to FIG. 4, in step 401, the transmitting end determines the reference transmission path. For instance, the transmitting end sets two or more of the transmission paths as the reference transmission paths.

In step 403, the transmitting end transmits the compensation signal in the i-th reference transmission path of the determined reference transmission paths. Herein, 'i' is an index of the reference transmission paths and the 'i' initial value is 1.

TABLE 2

| | | $1^{st}$ antenna | $2^{nd}$ antenna | $3^{rd}$ antenna | $4^{th}$ antenna |
|---|---|---|---|---|---|
| 1 | $W_{rx}^{temp1}$ ==> $W_{rx}^{temp1}$ - $\angle(Tx1 + \theta_{Rx2})$ | — | $\angle(Tx1 + \theta_{Rx2})$ ==> $\angle 0$ | $\angle(Tx1 + \theta_{Rx3})$ ==> $\angle(\theta_{Rx3} - \theta_{Rx2})$ | $\angle(Tx1 + \theta_{Rx4})$ ==> $\angle(\theta_{Rx4} - \theta_{Rx2})$ |
| 2 | $W_{rx}^{temp1}$ ==> $W_{rx}^{temp2}$ - $\angle(Tx4 + \theta_{Rx1})$ | $\angle(Tx4 + \theta_{Rx1})$ ==> $\angle 0$ | $\angle(Tx4 + \theta_{Rx2})$ ==> $\angle(\theta_{Rx2} - \theta_{Rx1})$ | $\angle(Tx4 + \theta_{Rx3})$ ==> $\angle(\theta_{Rx3} - \theta_{Rx1})$ | — |
| 3 | ==> $W_{rx}^{temp2}$ - $\angle(\theta_{Rx2} - \theta_{Rx1})$ | ==> $\angle(\theta_{Rx1} - \theta_{Rx2})$ | ==> $\angle 0$ | ==> $\angle(\theta_{Rx3} - \theta_{Rx2})$ | |
| 4 | $W_{rx}^{final}$ = conj($W_{rx}^{temp2}$) | $\angle(\theta_{Rx2} - \theta_{Rx1})$ | $\angle 0$ | $\angle(\theta_{Rx2} - \theta_{Rx3})$ | $\angle(\theta_{Rx2} - \theta_{Rx4})$ |

In step 405, the transmitting end determines whether the compensation signal transmitted in the reference transmission path is received in the reception paths. At this time, no compensation signal is received in the reception path connected to the antenna of the reference transmission path.

When receiving the compensation signals in the reception paths, the transmitting end determines the phase difference of the reception paths using the compensation signals received in the reception paths in step 407. Since the transmitting end cannot receive the compensation signal in the reception path connected to the antenna of the reference transmission path, the transmitting end cannot determine the phase difference of the reception path connected to the antenna of the reference transmission path.

In step 409, the transmitting end determines whether the compensation signal is sent in every reference transmission path determined in step 401.

When the compensation signal is not transmitted in every reference transmission path, the transmitting end increases the reference transmission path index by one (i=i+1) in step 415.

Next, the transmitting end returns to step 403 and transmits the compensation signal in the i-th reference transmission path.

When the compensation signal is sent in every reference transmission path in step 409, the transmitting end determines the relative phase difference of the reception paths using the phase difference of the reception paths acquired by transmitting the compensation signal in the reference transmission paths in step 411. For example, the transmitting end determines the relative phase difference of the reference reception path by defining one reception path as the reference reception path as expressed in the third operation of Table 2.

In step 413, the transmitting end calibrates the reception paths using the conjugate component of the relative phase difference of the reception paths.

Next, the transmitting end ends this process.

With the transmitting end constructed as above, the calibration method of the transmission paths is now described.

Figure 5:
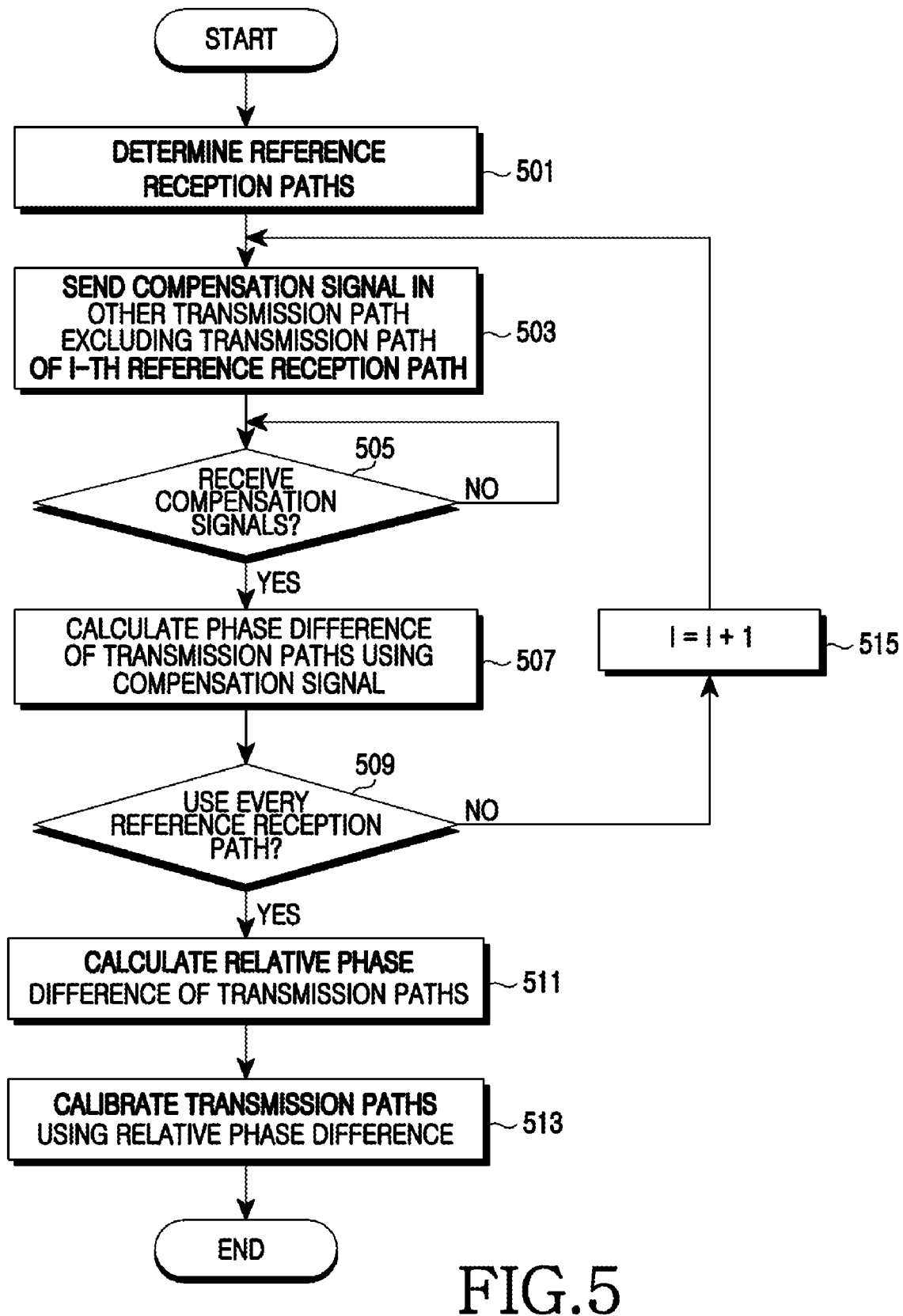
FIG. 5 illustrates a calibration method of a transmission path in a multi-antenna system according to an exemplary embodiment of the present invention.

FIG. 5 illustrates a calibration method of a transmission path in a multi-antenna system according to an exemplary embodiment of the present invention.

Referring to FIG. 5, in step 501, the transmitting end determines the reference reception path. For instance, the transmitting end sets two or more of the reception paths as the reference reception paths.

In step 503, the transmitting end transmits the compensation signal in the transmission paths in sequence. The transmitting end does not transmit the compensation signal in the transmission path connected to the antenna of the i-th reference reception path. Herein, 'i' is an index of the reference reception paths and its initial value is 1.

In step 505, the transmitting end determines whether the compensation signals transmitted in the transmission paths in sequence are received in the i-th reference reception path.

When receiving the compensation signals in the i-th reception path, the transmitting end determines the phase difference of the transmission paths to which the compensation signal was transmitted, using the compensation signals received in the i-th reception path in step 507.

In step 509, the transmitting end determines whether the compensation signal is received from every reference reception path determined in step 501.

When the compensation signal is not received in every reference reception path, the transmitting end increases the reference reception path index by one (i=i+1) in step 515.

Next, the transmitting end returns to step 503 and sequentially transmits the compensation signal in other transmission paths excluding the transmission path connected to the antenna of the i-th reference reception path.

When the compensation signal is received in every reference reception path in step 509, the transmitting end determines the relative phase difference of the transmission paths using the phase difference of the transmission paths acquired by using the compensation signals received in the reference reception paths in step 511. For example, the transmitting end determines the relative phase difference of the reference transmission path by defining one transmission path as the reference transmission path as expressed in the third operation of Table 1.

In step 513, the transmitting end calibrates the transmission paths using the conjugate component of the relative phase difference of the transmission paths.

Next, the transmitting end ends this process.

In the exemplary embodiments of the present invention, the transmitting end of the multi-antenna system calibrates the reception path using the relative phase difference of the reception paths acquired by setting the reference transmission path. Also, the transmitting end calibrates the transmission path using the relative phase difference of the transmission paths acquired by setting the reference reception path. Accordingly, the transmitting end designates two or more reference transmission paths to calibrate the reception path and designates two or more reference reception paths to calibrate the transmission path.

As set forth above, the multi-antenna system carries out calibration by use of relative phase difference of transmission paths and reception paths, without using separate compensation transmission and reception paths for the calibration. Therefore, additional cost may be reduced and complexity incurred by the compensation transmission and reception path for the calibration may be reduced. Accordingly, accuracy of the calibration by adopting the interference rejection may be increased.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A calibration method of a reception path in a wireless communication system comprising at least two antennas, the method comprising:

setting at least two transmission paths connected to antennas, respectively, as reference transmission paths;

when receiving compensation signals transmitted in the reference transmission paths in at least two reception paths connected to the antennas, respectively, determining a phase difference of the reception paths with regard to each reference transmission path not connected to a same antenna as the reception paths using the received compensation signals; and calibrating the reception paths using the phase difference of the reception paths.

2. The calibration method of claim 1, wherein the determining of the phase difference of the reception paths comprises:

transmitting the compensation signal in any one of the reference transmission paths; and when the transmitted compensation signals are received in other reception paths excluding the reception paths connected to same antennas as the reference transmission paths in which the compensation signals are transmitted, determining the phase difference of the other reception paths using the received compensation signals.

3. The calibration method of claim 2, further comprising:
after determining the phase difference of the reception paths, determining whether there is a reference transmission path which does not transmit the compensation signals;
when there is the reference transmission path which does not transmit the compensation signals, transmitting the compensation signals in the reference transmission path which does not transmit the compensation signals; and
when the transmitted compensation signals are received in other reception paths excluding the reception paths connected to the same antennas as the reference transmission path in which the compensation signals are transmitted, determining the phase difference of the other reception paths using the received compensation signals.

4. The calibration method of claim 3, further comprising when the compensation signals are transmitted in every reference transmission path, determining a relative phase difference of all of the reception paths using phase differences of the reception paths acquired by receiving the compensation signals transmitted in the respective reference transmission paths.

5. The calibration method of claim 4, wherein the determining of the relative phase difference comprises determining the relative phase difference of all of the reception paths based on any one of the reception path.

6. The calibration method of claim 4, wherein the calibrating of the reception paths comprises calibrating the reception paths using a conjugate component of the relative phase difference of the reception paths.

7. A calibration apparatus of a reception path in a multi-antenna system, the apparatus comprising:
at least two antennas;
at least two transmission paths connected to antennas, respectively, for transmitting a signal;
at least two reception paths connected to the antennas, respectively, for receiving a signal;
a controller for setting at least two of the transmission paths as reference transmission paths, for transmitting a compensation signal in each reference transmission path, and for transmitting the compensation signals to a compensation signal processor when the transmitted compensation signals are received in the reception paths; and
the compensation signal processor for determining a phase difference of the reception paths with regard to each reference transmission path not connected to a same antenna as the reception paths using the compensation signal provided from the controller, and for calibrating the reception paths using the determined phase difference of the reception paths.

8. The calibration apparatus of claim 7, wherein the controller controls to receive the compensation signal transmitted in one of the reference transmission paths, in other reception paths excluding the reception paths connected to same antenna as the reference transmission paths.

9. The calibration apparatus of claim 7, wherein the controller transmits the compensation signal in a first reference transmission path of the reference transmission paths, and when the compensation signal transmitted in the first reference transmission path is received in other reception paths excluding the reception paths connected to the same antennas as the first reference transmission path, the controller transmits the compensation signal in a second reference transmission path.

10. The calibration apparatus of claim 7, wherein the compensation signal processor determines a phase difference of the reception paths in which the compensation signal is received, using the compensation signal provided from the controller, determines a relative phase difference of all of the reception paths based on one of the reception paths using the determined phase difference of the reception paths, and calibrates the reception paths using a conjugate component of the relative phase difference.

* * * * *

UNITED STATES PATENT AND TRADEMARK OFFICE
CERTIFICATE OF CORRECTION

PATENT NO. : 8,260,234 B2
APPLICATION NO. : 12/358881
DATED : September 4, 2012
INVENTOR(S) : Heon-Ki Chae et al.

It is certified that error appears in the above-identified patent and that said Letters Patent is hereby corrected as shown below:

In the Claims:

Delete claim 1, column 12, line 46, the text beginning with "1. A calibration method" to and ending "reception paths." in column 12, line 59, and insert the following claim:

--1. A calibration method of a reception path in a wireless communication system comprising at least two antennas, the method comprising:
　　setting at least two transmission paths connected to antennas, respectively, as reference transmission paths;
　　when receiving compensation signals transmitted in the reference transmission paths in at least two reception paths connected to the antennas, respectively, determining a phase difference of the reception paths using the received compensation signals; and
　　calibrating the reception paths using the phase difference of the reception paths.--

Delete claim 7, column 13, line 36, the text beginning with "7. A calibration apparatus" to and ending "reception paths." in column 14, line 15, and insert the following claim:

--7. A calibration apparatus of a reception path in a multi-antenna system, the apparatus comprising:
　　at least two antennas;
　　at least two transmission paths connected to antennas, respectively, for transmitting a signal;
　　at least two reception paths connected to the antennas, respectively, for receiving a signal;
　　a controller for setting at least two of the transmission paths as reference transmission paths, for transmitting a compensation signal in each reference transmission path, and for transmitting the compensation signals to a compensation signal processor when the transmitted compensation signals are received in the reception paths; and
　　the compensation signal processor for determining a phase difference of the reception paths using the compensation signal provided from the controller, and for calibrating the reception paths using the determined phase difference of the reception paths.--

Signed and Sealed this
Eighteenth Day of March, 2014

Michelle K. Lee
*Deputy Director of the United States Patent and Trademark Office*